United States Patent
Yi et al.

(10) Patent No.: US 12,266,479 B2
(45) Date of Patent: *Apr. 1, 2025

(54) MULTILAYER ELECTRONIC COMPONENT INCLUDING NON-CONDUCTIVE RESIN LAYER ON BODY THEREOF

(71) Applicant: SAMSUNG ELECTRO-MECHANICS CO., LTD., Suwon-si (KR)

(72) Inventors: Jae Seok Yi, Suwon-si (KR); Jung Min Kim, Suwon-si (KR); Bon Seok Koo, Suwon-si (KR); Chang Hak Choi, Suwon-si (KR); Il Ro Lee, Suwon-si (KR); Byung Woo Kang, Suwon-si (KR); San Kyeong, Suwon-si (KR); Hae Sol Kang, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/440,863

(22) Filed: Feb. 13, 2024

(65) Prior Publication Data
US 2024/0186070 A1 Jun. 6, 2024

Related U.S. Application Data

(63) Continuation of application No. 18/094,668, filed on Jan. 9, 2023, now Pat. No. 11,935,703, which is a
(Continued)

(30) Foreign Application Priority Data
Sep. 6, 2019 (KR) .................. 10-2019-0110682

(51) Int. Cl.
*H01G 4/30* (2006.01)
*H01G 2/02* (2006.01)
(Continued)

(52) U.S. Cl.
CPC ................. *H01G 4/30* (2013.01); *H01G 2/02* (2013.01); *H01G 4/008* (2013.01); *H01G 4/012* (2013.01); *H01G 4/1218* (2013.01)

(58) Field of Classification Search
None
See application file for complete search history.

(56) References Cited

U.S. PATENT DOCUMENTS

| | | |
|---|---|---|
| 5,339,068 A | 8/1994 | Tsunoda et al. |
| 10,366,834 B1 | 7/2019 | Lee et al. |

(Continued)

FOREIGN PATENT DOCUMENTS

| | | |
|---|---|---|
| CN | 109411234 A | 3/2019 |
| CN | 110176355 A | 8/2019 |

(Continued)

OTHER PUBLICATIONS

Office Action issued in corresponding Korean Patent Application No. 10-2019-0110682 issued Nov. 6, 2020, with English translation.
(Continued)

*Primary Examiner* — Nathan Milakovich
*Assistant Examiner* — Daniel M Dubuisson
(74) *Attorney, Agent, or Firm* — MORGAN, LEWIS & BOCKIUS LLP

(57) ABSTRACT

A multilayer electronic component has a body and a non-conductive resin layer. The non-conductive resin layer includes a body cover portion disposed in a region of an external surface of the body in which an electrode layer of an external electrode is not disposed, and an extending portion extending from the body cover portion between the
(Continued)

electrode layer and a conductive resin layer of the external electrode, to thereby suppress arc discharge, improve bending strength, and improve moisture resistance.

16 Claims, 9 Drawing Sheets

Related U.S. Application Data continuation of application No. 17/733,068, filed on Apr. 29, 2022, now Pat. No. 11,636,984, which is a continuation of application No. 16/834,346, filed on Mar. 30, 2020, now Pat. No. 11,393,630.

(51) Int. Cl.
    *H01G 4/008*  (2006.01)
    *H01G 4/012*  (2006.01)
    *H01G 4/12*   (2006.01)

(56) References Cited

U.S. PATENT DOCUMENTS

| | | | |
|---|---|---|---|
| 11,393,630 B2 | 7/2022 | Yi et al. | |
| 11,501,922 B2 | 11/2022 | Kim et al. | |
| 11,636,984 B2 | 4/2023 | Yi et al. | |
| 11,935,703 B2 * | 3/2024 | Yi | H01G 4/232 |
| 2010/0039748 A1 | 2/2010 | Fujii et al. | |
| 2010/0302704 A1 | 12/2010 | Ogawa et al. | |
| 2013/0242457 A1 | 9/2013 | Lee et al. | |
| 2016/0172110 A1 | 6/2016 | Otani | |
| 2017/0301468 A1 | 10/2017 | Kim et al. | |
| 2018/0166215 A1 | 6/2018 | Hamanaka et al. | |
| 2019/0131076 A1 | 5/2019 | Fukumura | |

FOREIGN PATENT DOCUMENTS

| | | |
|---|---|---|
| JP | H08-203770 A | 8/1996 |
| JP | 2010-278373 A | 12/2012 |
| KR | 10-2018-0084030 A | 7/2018 |
| KR | 10-2019-0004631 A | 1/2019 |
| KR | 10-2019-0019792 A | 2/2019 |
| KR | 10-2019-0019793 A | 2/2019 |

OTHER PUBLICATIONS

Final Office Action issued in corresponding U.S. Appl. No. 16/834,346, filed Mar. 1, 2022.
Office Action issued in corresponding U.S. Appl. No. 16/834,346, filed Oct. 29, 2021.
Chinese Office Action dated Jul. 27, 2022, issued in corresponding Chinese Patent Application No. 202010688179.X.
Final Office Action issued in corresponding U.S. Appl. No. 16/834,346, filed Oct. 29, 2021.
Notice of Allowance issued in corresponding U.S. Appl. No. 16/834,346, filed May 4, 2022.
Ex Parte Quayle issued in corresponding U.S. Appl. No. 17/733,068, filed Oct. 6, 2022.
Notice of Allowance issued in corresponding U.S. Appl. No. 18/094,668, filed Nov. 15, 2023.
Final Office Action issued in corresponding U.S. Appl. No. 18/094,668, filed Aug. 18, 2023.
Office Action issued in corresponding U.S. Appl. No. 18/094,668, filed May 2, 2023.

* cited by examiner

MULTILAYER ELECTRONIC COMPONENT INCLUDING NON-CONDUCTIVE RESIN LAYER ON BODY THEREOF

CROSS-REFERENCE TO RELATED APPLICATION(S)

This application is the continuation application of U.S. patent application Ser. No. 18/094,668 filed on Jan. 9, 2023, which is the continuation application of U.S. patent application Ser. No. 17/733,068 filed on Apr. 29, 2022, now U.S. Pat. No. 11,636,984 issued on Apr. 25, 2023, which is the continuation application of U.S. patent application Ser. No. 16/834,346 filed on Mar. 30, 2020, now U.S. Pat. No. 11,393,630 issued on Jul. 19, 2022, which claims the benefit under 35 USC 119 (a) of Korean Patent Application No. 10-2019-0110682 filed on Sep. 6, 2019 in the Korean Intellectual Property Office, the entire disclosures of which are incorporated herein by reference for all purposes

BACKGROUND

1. Field

The present disclosure relates to a multilayer electronic component.

2. Description of Related Art

A multilayer ceramic capacitor (MLCC) is a type of multilayer electronic component, and may be a chip type capacitor mounted on the printed circuit boards of various electronic products such as imaging devices including liquid crystal displays (LCDs), plasma display panels (PDPs), and the like, and computers, smartphones, mobile phones, and the like, serving to charge or discharge electricity therein or therefrom.

Such multilayer ceramic capacitors may be used as components of various electronic devices due to their relatively small size, relatively high capacitance, and relative ease of mounting. As various electronic devices such as computers, mobile devices, or the like are miniaturized and increased in terms of output, demand for miniaturization and high capacitance of multilayer ceramic capacitors is increasing.

In addition, recent as interest in vehicle electric/electronic components has increased, multilayer ceramic capacitors have also come to require relatively high reliability and strength characteristics to be used in vehicle or infotainment systems.

In order to secure high-reliability and high-strength characteristics, a method of changing a conventional external electrode, including an electrode layer, to have a double-layer structure including an electrode layer and a conductive resin layer has been proposed.

In the double-layer structure including the electrode layer and the conductive resin layer, a resin composition, including a conductive material, is applied onto the electrode layer to absorb external impacts and to prevent permeation of plating liquid. As a result, reliability may be improved.

However, as electric vehicles, autonomous vehicles, and the like, have been developed in the automotive industry, a greater number of multilayer ceramic capacitors are required, and multilayer ceramic capacitors used in automobiles and the like are required to have stricter moisture resistance reliability and bending strength characteristics secured therein.

SUMMARY

An aspect of the present disclosure is to provide a multilayer electronic component capable of suppressing arc discharge.

An aspect of the present disclosure is to provide a multilayer electronic component having improved bending strength characteristics.

An aspect of the present disclosure is to provide a multilayer electronic component having improved moisture resistance characteristics.

An aspect of the present disclosure is to provide a multilayer electronic component in which electrical connectivity between an electrode layer and a conductive resin layer is improved, to allow for low equivalent series resistance (ESR).

However, the objects of the present disclosure are not limited to the above, and more generally include the concepts described below.

According to an aspect of the present disclosure, a multilayer electronic component includes a body having dielectric layers, and first internal electrodes and second internal electrodes alternately laminated with respective dielectric layers interposed therebetween, and having first and second surfaces opposing each other in a lamination direction, third and fourth surfaces connected to the first and second surfaces and opposing each other, and fifth and sixth surfaces connected to the first to fourth surfaces and opposing each other. A first external electrode includes a first electrode layer connected to the first internal electrodes and a first conductive resin layer disposed on the first electrode layer, and having a first connection portion disposed on the third surface of the body and a first band portion extending from the first connection portion to a portion of each of the first, second, fifth, and sixth surfaces, and a second external electrode includes a second electrode layer connected to the second internal electrodes and a second conductive resin layer disposed on the second electrode layer, and having a second connection portion disposed on the fourth surface of the body and a second band portion extending from the second connection portion to a portion of each of the first, second, fifth, and sixth surfaces. A non-conductive resin layer has a body cover portion disposed in a region of external surfaces of the body in which the first and second electrode layers are not disposed, a first extending portion disposed to extend from the body cover portion between the first electrode layer and the first conductive resin layer of the first band portion, and a second extending portion disposed to extend from the body cover portion between the second electrode layer and the second conductive resin layer of the second band portion.

According to another aspect of the present disclosure, a multilayer electronic component includes a body having first internal electrodes and second internal electrodes that are alternately stacked to overlap with each other and have dielectric layers interposed therebetween, and first and second external electrodes respectively connected to the first and second internal electrodes, each including an electrode layer connected to the first internal electrodes or the second internal electrodes, and each including a conductive resin layer disposed on the electrode layer. The first and second external electrodes are disposed on respective opposing external surfaces of the body, and each extend from the respective opposing external surface to an adjacent external surface of the body and a corner therebetween, and a non-conductive resin layer is disposed in a region of the external surfaces of the body in which the electrode layers of the first and second external electrodes are not disposed, and the non-conductive resin layer is disposed between the electrode layer and the conductive resin layer of each of the first and second external electrodes in each of the opposing external surfaces and adjacent external surfaces in which the first and second external electrodes are disposed.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
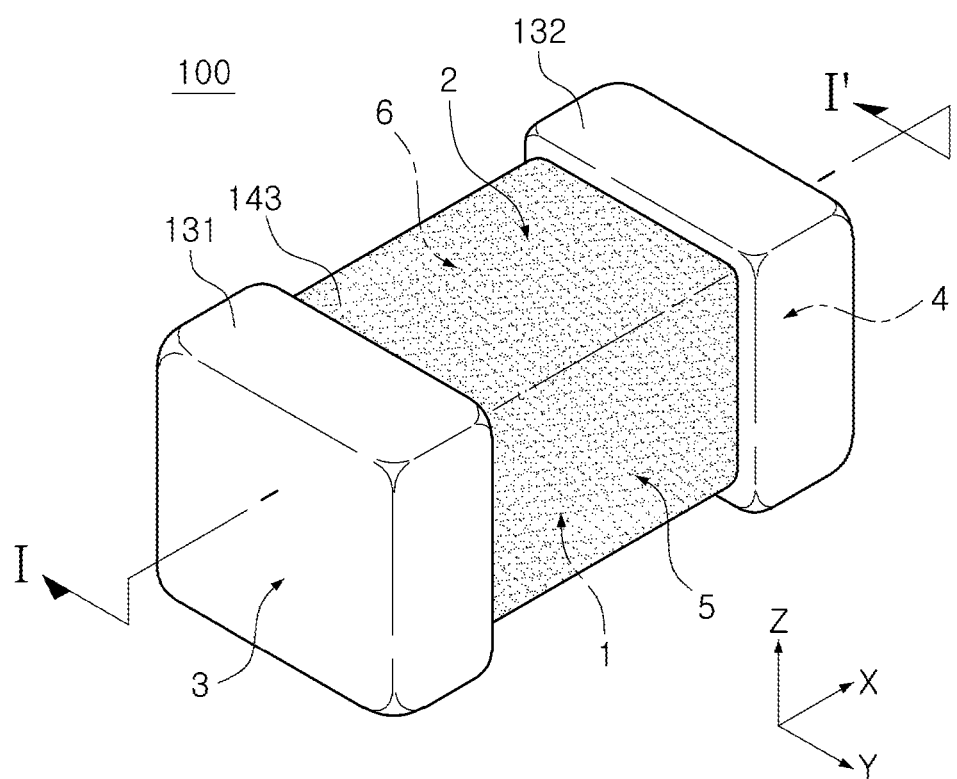
FIG. 1 is a schematic perspective view of a multilayer electronic component according to an embodiment of the present disclosure.

Hereinafter, embodiments of the present disclosure will be described with reference to specific embodiments and the accompanying drawings. However, embodiments of the present disclosure may be modified to have various other forms, and the scope of the present disclosure is not limited to the embodiments described below. Further, embodiments of the present disclosure may be provided for a more complete description of the present disclosure to the ordinarily skilled artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly show layers and regions. The same reference numerals will be used to designate the same components. Further, throughout the specification, when an element is referred to as "comprising" or "including" another element, it means that the element may further include other elements as well, without departing from the other elements, unless specifically stated otherwise.

In the drawing, an X direction may be defined as a second direction, an L direction, or a longitudinal direction; a Y direction may be defined as a third direction, a W direction, or a width direction; and a Z direction may be defined as a first direction, a stacking direction, a T direction, or a thickness direction.

Multilayer Electronic Component

FIG. 1 is a schematic perspective view of a multilayer electronic component according to an embodiment.

Figure 2:
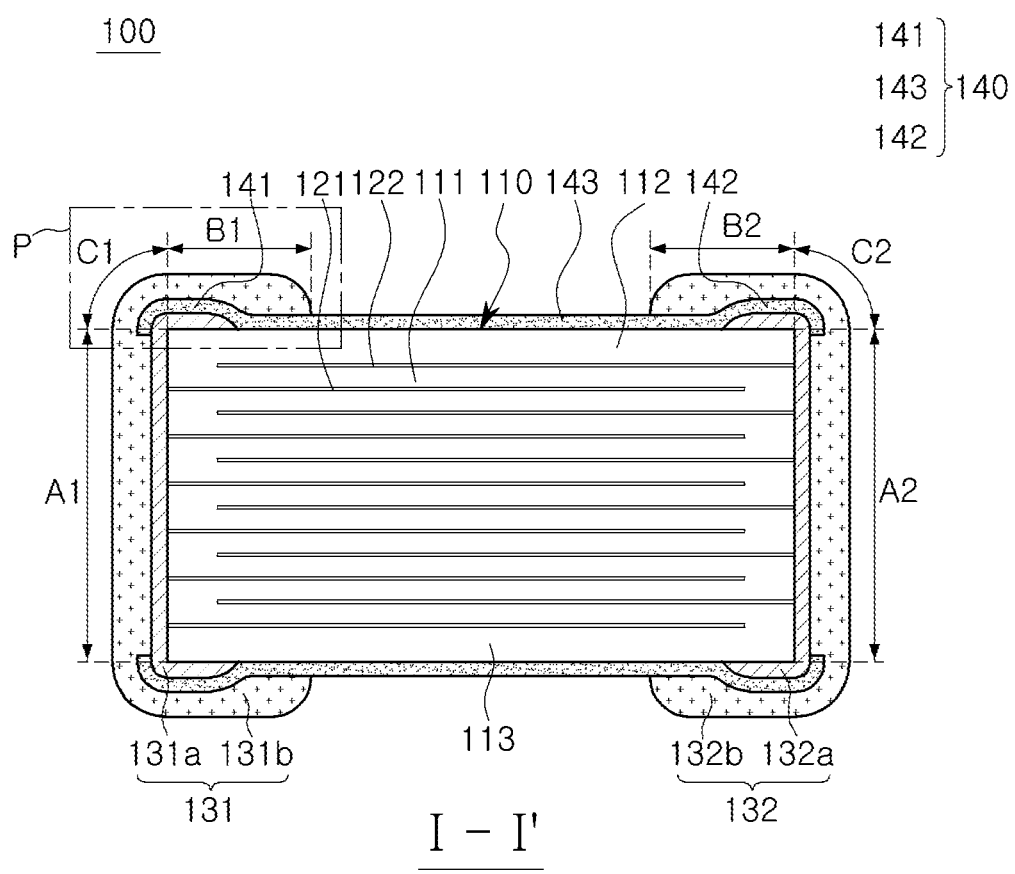
FIG. 2 is a cross-sectional view taken along line I-I' in FIG. 1.

FIG. 2 is a cross-sectional view taken along line I-I' in FIG. 1.

Figure 3:
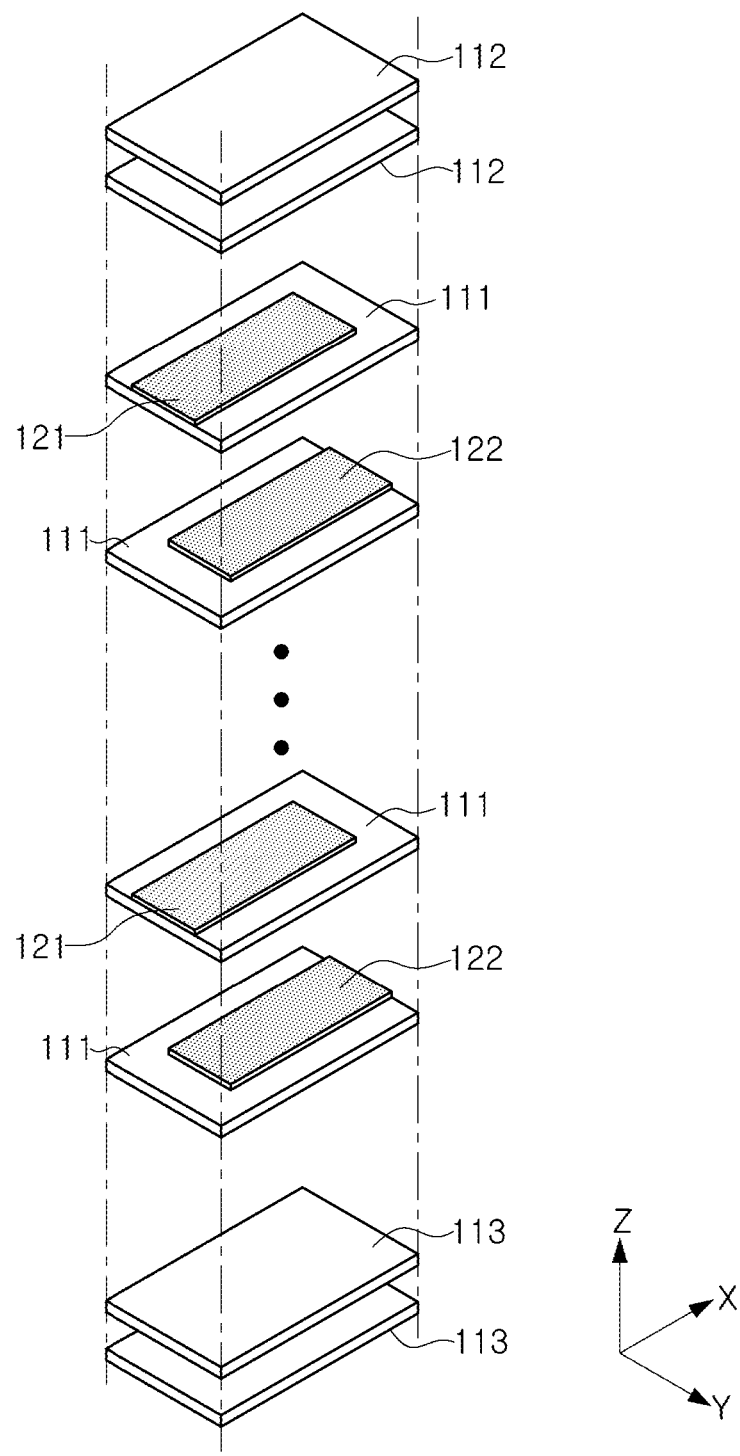
FIG. 3 is a schematic exploded perspective view of a body, in which dielectric layers and internal electrodes are laminated, according to an embodiment of the present disclosure.

FIG. 3 is a schematic exploded perspective view of a body, in which dielectric layers and internal electrodes are laminated, according to an embodiment.

Figure 4:
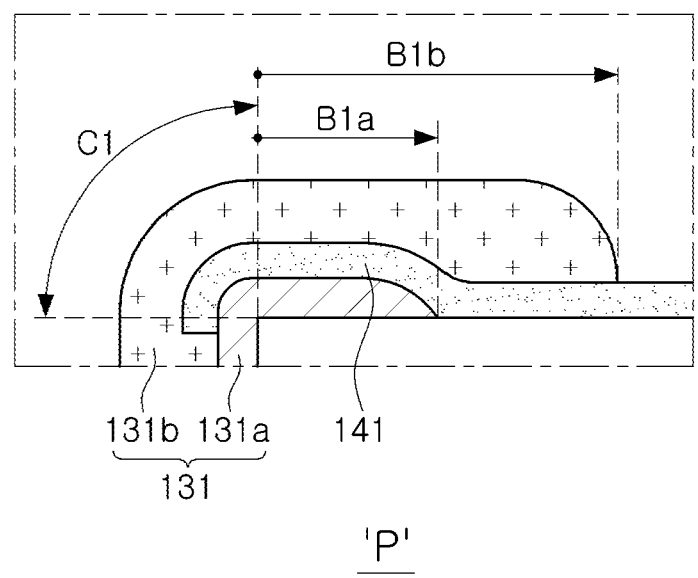
FIG. 4 is an enlarged view of region P in FIG. 2.

FIG. 4 is an enlarged view of region P in FIG. 2.

Hereinafter, a multilayer electronic component 100 according to an embodiment will be described with reference to FIGS. 1 to 4.

A multilayer electronic component 100 according to an embodiment may include a body 110 including dielectric layers 111, and first and second internal electrodes 121 and 122 alternately laminated with respective dielectric layers 111 interposed therebetween, and having first and second surfaces 1 and 2 opposing each other in a lamination direction (a Z direction), third and fourth surfaces 3 and 4 connected to the first and second surfaces 1 and 2 and opposing each other, and fifth and sixth surfaces 5 and 6 connected to the first to fourth surfaces 1, 2, 3, and 4 and opposing each other, a first external electrode 131 including a first electrode layer 131a connected to the first internal electrode (s) 121 and a first conductive resin layer 131b disposed on the first electrode layer 131a, and having a first connection portion A1 disposed on the third surface 3 of the body 110 and a first band portion B1 extending from the first connection portion A1 to a portion of each of the first, second, fifth, and sixth surfaces 1, 2, 5, and 6, a second external electrode 132 including a second electrode layer 132a connected to the second internal electrode (s) 122 and a second conductive resin layer 132b disposed on the second electrode layer 132a, and having a second connection portion A2 disposed on the fourth surface 4 of the body 110 and a second band portion B2 extending from the second connection portion A2 to a portion of each of the first, second, fifth, and sixth surfaces 1, 2, 5, and 6, and a non-conductive resin layer 140 having a body cover portion 143 disposed in a region of external surfaces of the body 110 in which the first and second electrode layers 131a and 132a are not disposed, a first extending portion 141 disposed to extend from the body cover portion 143 between the first electrode layer 131a and the first conductive resin layer 131b of the first band portion B1, and a second extending portion 142 disposed to extend from the body cover portion 143 between the second electrode layer 132a and the second conductive resin layer 132b of the second band portion B2.

In the body 110, the dielectric layers 111 and the internal electrodes 121 and 122 are alternately laminated.

The body 110 is not limited in shape, but may have a hexahedral shape or a shape similar thereto. Due to shrinkage of ceramic powder particles included in the body 110 during sintering, the body 110 may have a substantially hexahedral shape rather than a hexahedral shape having complete straight lines or edges.

The body 110 may have the first and second surfaces 1 and 2 opposing each other in a thickness direction (a Z direction), the third and fourth surfaces 3 and 4 connected to the first and second surfaces 1 and 2 and opposing each other in a length direction (an X direction), and the fifth and sixth surfaces 5 and 6 connected to the first and second surfaces 1 and 2 and as well as to the third and fourth surfaces 3 and 4 and opposing each other in a width direction (a Y direction).

The plurality of dielectric layers 111, constituting the body 110, is in a sintered state and the dielectric layers 111 may be integrated with each other such that boundaries therebetween may not be readily apparent without using a scanning electron microscope (SEM).

According to an embodiment, a raw material forming the dielectric layer (s) 111 is not limited as long as sufficient capacitance may be obtained. For example, a barium titanate-based material, a lead composite perovskite-based material, a strontium titanate-based material, or the like, may be used.

Various ceramic additives, organic solvents, plasticizers, binders, dispersants, or the like may be added to the powder of barium titanate ($BaTiO_3$), and the like, according to the purpose of the present disclosure, as the material for forming the dielectric layer 111.

The body 110 may have a capacitance forming portion disposed in the body 110 and including the first and second internal electrode layers 121 and 122, alternately disposed to overlap each other with the dielectric layer (s) 111 interposed therebetween, to form capacitance, and upper and lower protective layers 112 and 113 disposed above and below the capacitance forming portion.

The capacitance forming portion may contribute to capacitance formation of a capacitor, and may be formed by repeatedly laminating the plurality of first and second internal electrode layers 121 and 122 with the dielectric layers 111 interposed therebetween.

The upper protective layer 112 and the lower protective layer 113 may be formed by laminating a single dielectric layer or two or more dielectric layers on upper and lower surfaces of the capacitance forming portion, respectively, in the vertical direction, and may basically play a role in preventing damage to the internal electrodes due to physical or chemical stress.

The upper protective layer 112 and the lower protective layer 113 may not include any internal electrode (s), and may include the same material as the dielectric layer 111.

The plurality of internal electrodes 121 and 122 may be disposed to overlap each other with the dielectric layer (s) 111 interposed therebetween.

The internal electrodes 121 and 122 may include first and second internal electrodes 121 and 122 alternately disposed to overlap each other with respective dielectric layers interposed therebetween.

The first and second internal electrodes 121 and 122 may be exposed to the third and fourth surfaces 3 and 4, respectively.

Referring to FIG. 2, the first internal electrode (s) 121 may be spaced apart from the fourth surface 4 and may be exposed through the third surface 3, and the second internal electrode (s) 122 may be spaced apart from the third surface 3 and may be exposed through the fourth surface 4. The first external electrode 131 may be disposed on the third surface 3 of the body 110 to be connected to the first internal electrode (s) 121, and the second external electrode 132 may be disposed on the fourth surface 4 of the body 110 to be connected to the second internal electrode (s) 122.

For example, the first internal electrode (s) 121 is/are not connected to the second external electrode 132 and is/are connected to the first external electrode 131, and the second internal electrodes 122 is/are not connected to the first external electrode 131 and is/are connected to the second external electrode 132. Thus, the first internal electrode (s) 121 is/are formed to be spaced apart from the fourth surface 4 by a predetermined distance, and the second internal electrode (s) 122 is/are formed to be spaced apart from the third surface 3 by a predetermined distance.

The first and second internal electrodes 121 and 122 may be electrically isolated from each other by the dielectric layer (s) 111 disposed therebetween.

Referring to FIG. 3, the body 110 may be formed by alternately laminating dielectric layer (s) 111 on which the first internal electrode 121 is printed and dielectric layer (s) 111 on which the second internal electrode 122 is printed, in a thickness direction (a Z direction) and sintering the alternately laminated dielectric layers 111.

The material forming the first and second internal electrodes 121 and 122 is not limited. For example, the first and second internal electrodes 121 and 122 may be formed using a conductive paste containing a noble metal material such as palladium (Pd), a palladium-silver (Pd—Ag) alloy, or the like, nickel (Ni), and copper (Cu).

A method of printing the conductive paste may be a screen-printing method, a gravure printing method, or the like, but is not limited thereto.

The external electrodes 131 and 132 are disposed on the body 110 and include electrode layers 131a and 132a and conductive resin layers 131b and 132b, respectively.

The external electrodes 131 and 132 may include first and second external electrodes 131 and 132, respectively connected to the first and second internal electrodes 121 and 122.

The first external electrode 131 includes a first electrode layer 131a and a first conductive resin layer 131b, and the second external electrode 132 includes a second electrode layer 132a and a second conductive resin layer 132b.

When the first external electrode 131 is divided with reference to FIG. 2 depending on a position in which it is disposed, the first external electrode 131 has a first connection portion A1, disposed on the third surface 3 of the body, and a band portion B1 extending from the first connection portion A1 to a portion of the first, second, fifth, and sixth surfaces 1, 2, 5, and 6.

A region between the first connection portion A1 and the first band portion B1 may be defined as a first corner portion C1.

When the second external electrode 132 is divided depending on a position in which it is disposed, the second external electrode 132 has a second connection portion A2, disposed on the fourth surface 4 of the body, and a band portion B2 extending from the second connection portion A2 to a portion of the first, second, fifth, and sixth surfaces 1, 2, 5, and 6.

A region between the second connection portion A2 and the second band portion B2 may be defined as a second corner portion C2.

The first and second electrode layers 131a and 132a may be formed using any material as long as it is a material having electrical conductivity such as a metal or the like, and a specific material may be determined in consideration of electrical characteristics, structural stability, and the like.

For example, the first and second electrode layers 131a and 132a may include a conductive metal and glass.

A conductive metal, used for the electrode layers 131a and 132a, is not limited as long as it may be electrically connected to the respective internal electrode (s) to form capacitance and may include at least one selected from the group consisting of, for example, copper (Cu), silver (Ag), nickel (Ni), and alloys thereof.

The electrode layers 131a and 132a may be formed by applying a conductive paste, prepared by adding a glass frit, to the conductive metal powder particles and sintering the conductive paste.

When the first and second electrode layers 131a and 132a include a conductive metal and glass, corner portions, at which the connection portions A1 and A2 and the band portions B1 and B2 meet, may be formed to be thin, or lifting may occur between ends of the band portions B1 and B2 and the body 110. Therefore, since moisture resistance reliability may be problematic, an effect of improving the moisture reliability may be more effective when the first and second electrode layers 131a and 132a include a conductive metal and glass.

The first and second electrode layers 131a and 132a may be formed by means of atomic layer deposition (ALD), molecular layer deposition (MLD), chemical vapor deposition (CVD) sputtering, or the like.

In addition, the first and second electrode layers 131a and 132a may be formed by transferring a sheet, including a conductive metal, onto the body 110.

The conductive resin layers 131b and 132b may include a conductive metal and a base resin.

The conductive metal, included in the conductive resin layers 131b and 132b, serves to electrically connect the conductive resin layers 131b and 132b to first plating layers formed thereon.

The conductive metal, included in the conductive resin layers 131b and 132b, is not limited as long as it may be electrically connected to the first plating layers and may include at least one selected from the group consisting of, for example, copper (Cu), silver (Ag), nickel (Ni), and alloys thereof.

The conductive metal, included in the conductive resin layers 131b and 132b, may include at least one of spherical powder particles and flake powder particles. For example, the conductive metal may include only flake powder particles, or only spherical powder particles, or a mixture of flake powder particles and spherical powder particles.

The spherical powder particles may have an incompletely spherical shape and may have, for example, a shape in which a ratio of a length of a major axis to a length of a minor axis (the major axis/the minor axis) that is 1.45 or less.

The flake powder particles refer to powder particles, each having a flat and elongated shape, and is not limited to a specific shape and, for example, a ratio of a length of a major axis and a length of a minor axis (the major axis/the minor axis) may be 1.95 or more.

The lengths of the major axes and the minor axes of the spherical powder particles and the flake powder particles may be measured from an image obtained by scanning a cross section (an L-T cross section), taken from a central portion of a multilayer electronic component in a width (Y) direction, in X and Z directions with a scanning electron microscope (SEM).

The base resin, included in the conductive resin layers 131b and 132b, serves to secure adhesion and to absorb impact.

The base resin, included in the conductive resin layers 131b and 132b, is not limited as long as it has adhesion and impact absorption and is mixed with conductive metal powder particles to prepare a paste and may include, for example, an epoxy-based resin.

In addition, the conductive resin layer may include a plurality of metal particles, an intermetallic compound, and a base resin.

According to the present disclosure, a non-conductive resin layer (e.g., 140) may be disposed to extend between an electrode layer (e.g., 131a and 132a) and a conductive resin layer (e.g., 131b and 132b, respectively), or a plurality of island-shaped adhesive portions may be disposed on a first electrode layer of a first connection portion and a second electrode layer of a second connection portion. Therefore, a contact area between the electrode layer and the conductive resin layer may be reduced. As a result, electrical connectivity between the electrode layer and the conductive resin layer may be deteriorated.

However, according to an embodiment, when the conductive resin layer includes a plurality of metal particles, an intermetallic compound, and a base resin, stable electrical connectivity may be secured.

The intermetallic compound may serve to connect a plurality of metal particles to improve electrical connectivity, and may serve to surround and connect the plurality of metal particles to each other.

In this case, the intermetallic compound may include a metal having a melting point lower than curing temperature of the base resin.

For example, since the intermetallic compound includes a metal having a melting point lower than the curing temperature of the base resin, the metal having a melting point lower than the curing temperature of the base resin is melted during drying and curing processes, and form an intermetallic compound with a portion of the metal particles to surround the metal particles. In this case, the intermetallic compound may include, in detail, a metal having a low melting point of 300° C. or less.

For example, the intermetallic compound may include tin (Sn) having a melting point of 213 to 220° C. During the drying and curing processes, Sn is molten. The molten Sn wets metal particles having a high melting point such as Ag, Ni, or Cu due to capillarity, and reacts with a portion of Ag, Ni, or Cu metal particles to form an intermetallic compound such as $Ag_3Sn$, $Ni_3Sn_4$, $Cu_6Sn_5$, $Cu_3Sn$, or the like. Ag, Ni, or Cu, not participating in reaction, remains in the form of metal particles.

Accordingly, the plurality of metal particles may include one or more of Ag, Ni, and Cu, and the intermetallic compound may include one or more of $Ag_3Sn$, $Ni_3Sn_4$, $Cu_6Sn_5$, and $Cu_3Sn$.

Figure 9:
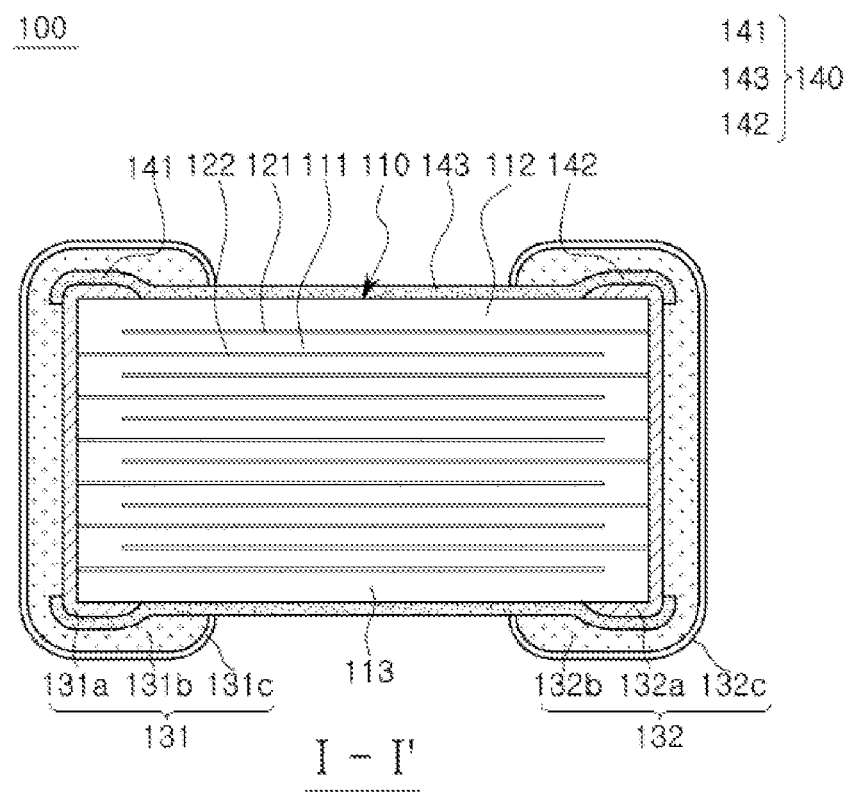
FIG. 9 is a cross-sectional view taken along line I-I' in FIG. 1, in case of adding plating layers.

Referring to FIG. 9, plating layers 131c and 132c may be additionally provided on the conductive resin layers 131b and 132b, respectively, to improve mounting characteristics of the external electrodes 131 and 132.

For example, the plating layers 131c and 132c may be Ni plating layers or Sn plating layers, or may include Ni plating layers and Sn plating layers, respectively and sequentially formed on the conductive resin layers. Alternatively, the plating layers 131c and 132c may include a plurality of Ni plating layers and/or a plurality of Sn plating layers.

The non-conductive resin layer 140 has a body cover portion 143 disposed in a region of the external surfaces of the body 110 in which the first and second electrode layers 131a and 132a are not disposed, a first extending portion 141 disposed to extend from the body cover portion 143 between the first electrode layer 131a and the first conductive resin layer 131b of the first band portion B1, and a second extending portion 142 disposed to extend from the body cover portion 143 between the second electrode layer 132a and the second conductive resin layer 132b of the second band portion B2.

The non-conductive resin layer 140 serves to prevent stress, generated when a substrate is deformed by thermal and physical impacts while the multilayer electronic component 100 is mounted on the substrate, from propagating to the body 110 and to prevent cracking.

In addition, the non-conductive resin layer 140 serves to improve moisture resistance by blocking moisture permeation paths.

The base resin, included in the conductive resin layers 131b and 132b, also plays a role in absorbing impacts, but the role of the base resin is limited.

In addition, when lengths of the first and second conductive resin layers 131b and 132b are increased to enhance bending stress, short-circuit may occur between the first and second conductive resin layers 131b and 132b and arc discharge may occur between the band ends of the first and second resin layers 131b and 132b under a high voltage.

Meanwhile, since the body cover portion 143 has an insulating property, it is disposed in a region of the external surfaces of the body 110 in which the first and second electrode layers 131a and 132a are not disposed, and thus the body cover portion 143 is disposed in a wider region to be more effective in absorbing impact and suppressing stress propagation.

The body cover portion 143 may prevent moisture from permeating into the body 110 through the external surface of the body 100 by sealing fine pores or cracking of the body 110.

In addition, the body cover portion 143 may suppress exposure of the surface of the body 110 to prevent arc discharge from occurring.

The first extending portion 141 is disposed to extend from the body cover portion 143 between the first electrode layer 131a and the first conductive resin layer 131b of the first band part B1, serving to suppress stress propagation to the body 110 and to prevent cracking.

In addition, the first extending portion 141 serves to suppress lifting between an end of the first electrode layer 131a, disposed on the first band portion B1, and the body 110 to improve moisture resistance reliability.

The second extending portion 142 is disposed to extend from the body cover portion 143 between the second electrode layer 132a and the second conductive resin layer 132b of the second band portion B2, serving to suppress stress propagation to the body 110 and to prevent cracking.

In addition, the second extending portion 142 serves to improve moisture resistance reliability by suppressing lifting between an end of the second electrode layer 132a, disposed in the second band portion B2, and the body 110.

The non-conductive resin layer 140 may be formed by forming the first and second electrode layers 131a and 132a on the body 110 including dielectric layers and internal electrodes, forming a non-conductive resin layer 140 on an exposed external surface of the body 110 and on the first and second electrode layers 131a and 132a, and removing the non-conductive resin layer 140 formed on the connection portions A1 and A2 of the first and second electrode layers 131a and 132a.

A method of removing the non-conductive resin 140 may be, for example, laser processing, mechanical polishing, dry etching, wet etching, shadowing deposition using a tape protective layer, or the like.

The non-conductive resin layer 140 may include a base resin.

The base resin, included in the non-conductive resin layer 140, is not limited as long as adhesion and impact absorption are provided thereby, and may be, for example, an epoxy-based resin.

The non-conductive resin layer 140 may include a base resin, and may include one or more of silica, alumina, glass, or zirconium dioxide ($ZrO_2$).

Silica, alumina, glass, and zirconium dioxide ($ZrO_2$) serve to improve an applying shape of the non-conductive resin layer 140. In addition, silica, alumina, glass, and zirconium dioxide ($ZrO_2$) may also serve to improve thermal resistance.

Figure 7:
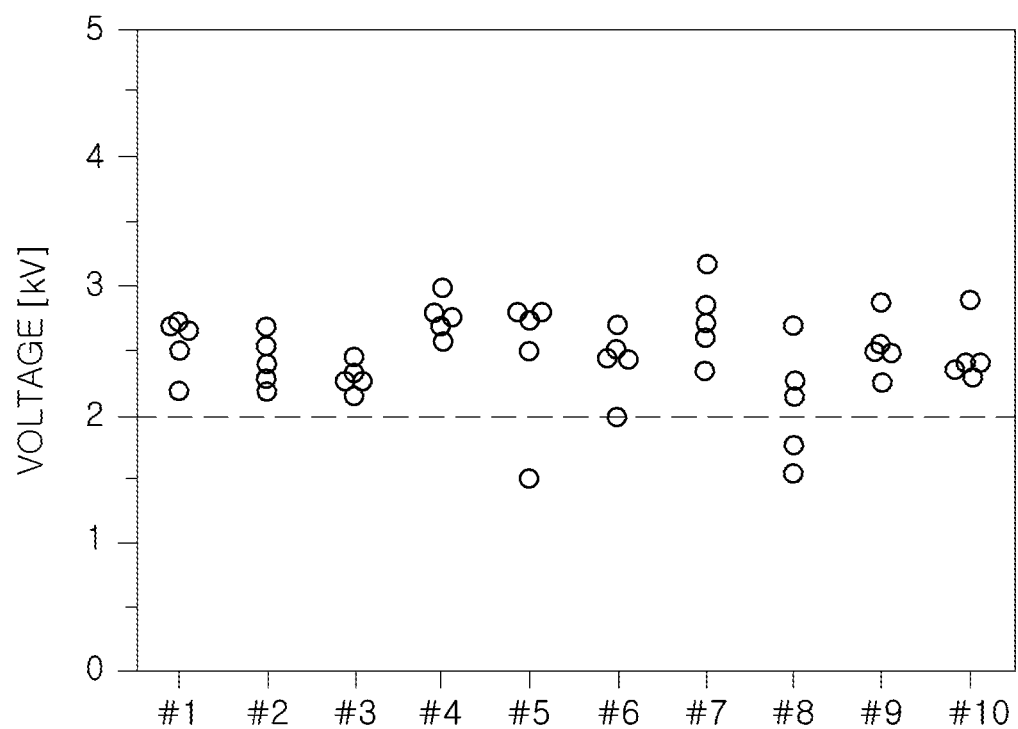
FIG. 7 illustrates measurements result of arc discharge tests on sample chips (Comparative Example) in which a non-conductive resin layer is not disposed.

FIG. 7 illustrates measurement results obtained by preparing a total of ten sample chips (Comparative Examples, #1 to #10), in which the non-conductive resin layer 140 is not disposed, and repeatedly measuring arc discharge occurrence voltages for the respective sample chips (Comparative Examples, #1 to #10) five times.

Figure 8:
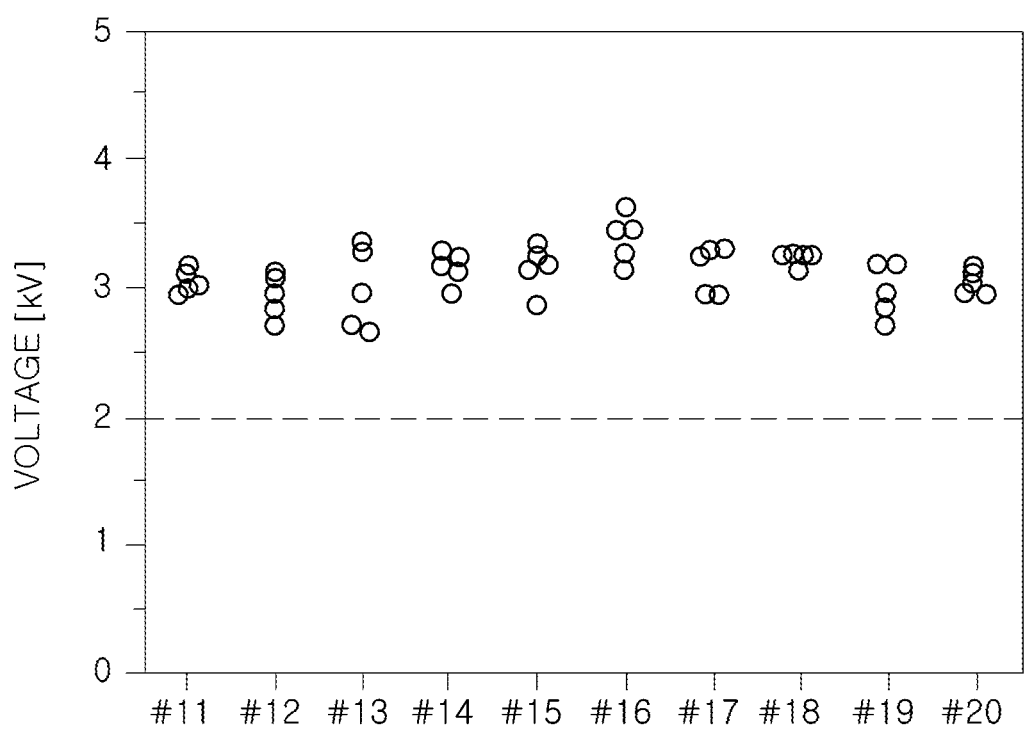
FIG. 8 illustrates measurement results of arc discharge tests on sample chips (Inventive Example) in which a non-conductive resin layer is disposed, according to an embodiment of the present disclosure.

FIG. 8 illustrates measurement results obtained by preparing a total of ten sample chips (Inventive Examples, #11 to #20), in which the non-conductive resin layer 140 according to an embodiment is disposed, and repeatedly measuring arc discharge occurrence voltages for the respective sample chips (Inventive Examples, #11 to #20) five times.

Referring to FIG. 7, there were four cases in which arc discharge occurred at a voltage of 2 kV or less, and an average value of the arc discharge occurrence voltages was about 2.5 kV.

Meanwhile, referring to FIG. 8, in the case of Inventive Examples, there was no case in which arc discharge occurred up to a voltage of 2.5 kV, in a total of 50 experiments, and an average value of the arc discharge occurrence voltages was 3.0 kV or more. As a result, Inventive Examples were excellent in providing an arc discharge suppression effect.

The first extending portion 141 may be disposed to cover the first corner portion C1 of the first electrode layer 131a, and the second extending portion 142 may be disposed to cover the second corner portion C2 of the second electrode layer 132a.

When the electrode layers 131a and 132a include a conductive metal and glass, the electrode layers 131a and 132a of the corner portions C1 and C2 (e.g., in regions between the connection portions A1 and A2 and the band portions B1 and B2) may be formed to be thin. Therefore, the corner portions C1 and C2 may act as main moisture permeation paths to deteriorate moisture resistance reliability.

In this regard, the extending portions 141 and 142 may be disposed to cover the corner portions C1 and C2 of the electrode layers 131a and 132a, and thus, may block the moisture permeation paths to improve the moisture resistance reliability.

Moreover, the first extending portion 141 may be disposed to extends to a portion between the first electrode layer 131a and the first conductive resin layer 131b of the first connection portion A1, and the second extending portion 142 may be disposed to extend to a portion between the second electrode layer 132a and the second conductive resin layer 132b of the second connection portion A2, and thus, may reliably block the moisture permeation paths to further improve the moisture resistance reliability.

Lengths of the first band portion B1 of the first conductive resin layer 131b and of the second band portion B2 of the second conductive resin layer 132b may each be 10 to 20% of a length of the body 110.

Referring to FIGS. 2 and 4, a length of the body may refer to a distance between a third surface and a fourth surface of the body, a length of the first band portion B1 of the first conductive resin layer 131b may be a distance B1b from the third surface of the body to an end of the first conductive resin layer 131b, and a length of the second band portion B2 of the second conductive resin layer 132b may be a distance from the fourth surface of the body to an end of the conductive resin layer 131b.

When the non-conductive resin layer 140 is not disposed, lengths of the first band portion B1 of the first conductive resin layer 131b and of the second band portion B2 of the second conductive resin layer 132b may each be maintained to be 20 to 30% of the length of the body 110 to secure the bending strength.

Meanwhile, when the non-conductive resin layer 140 is disposed according to an embodiment, sufficient bending strength may be secured even if the first band portion B1 of the first conductive resin layer 131b and the second band portion B2 of the second conductive resin layer 132b are each 10 to 20% of the length of the body 110. Therefore, the arc discharge suppressing effect may be further improved.

In addition, to further improve the bending strength, the distance B1b from the third surface of the body 110 to the end of the first conductive resin layer 131b may be greater than a distance B1a from the third surface of the body 110 to an end of the first electrode layer 131a. Similarly, a distance from the fourth side of the body 110 to an end of the second conductive resin layer 132b may be greater than a distance from the fourth side of the body 110 to an end of the second electrode layer 132a.

Figure 5:
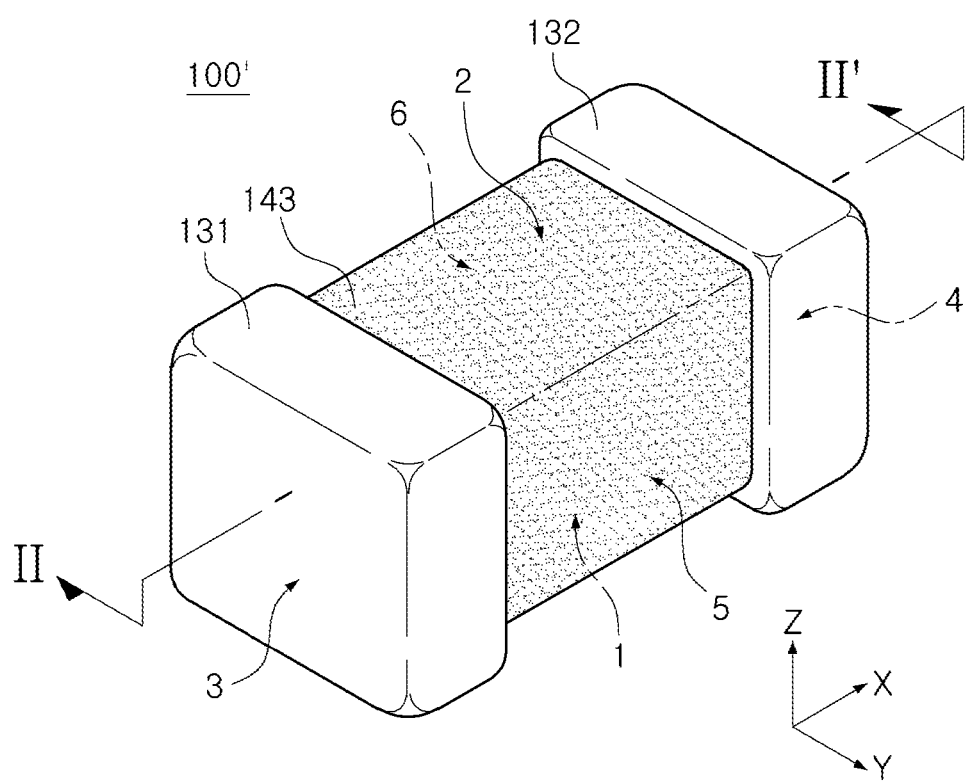
FIG. 5 is a schematic perspective view of a multilayer electronic component according to another embodiment of the present disclosure.

FIG. 5 is a schematic perspective view of a multilayer electronic component according to another embodiment.

Figure 6:
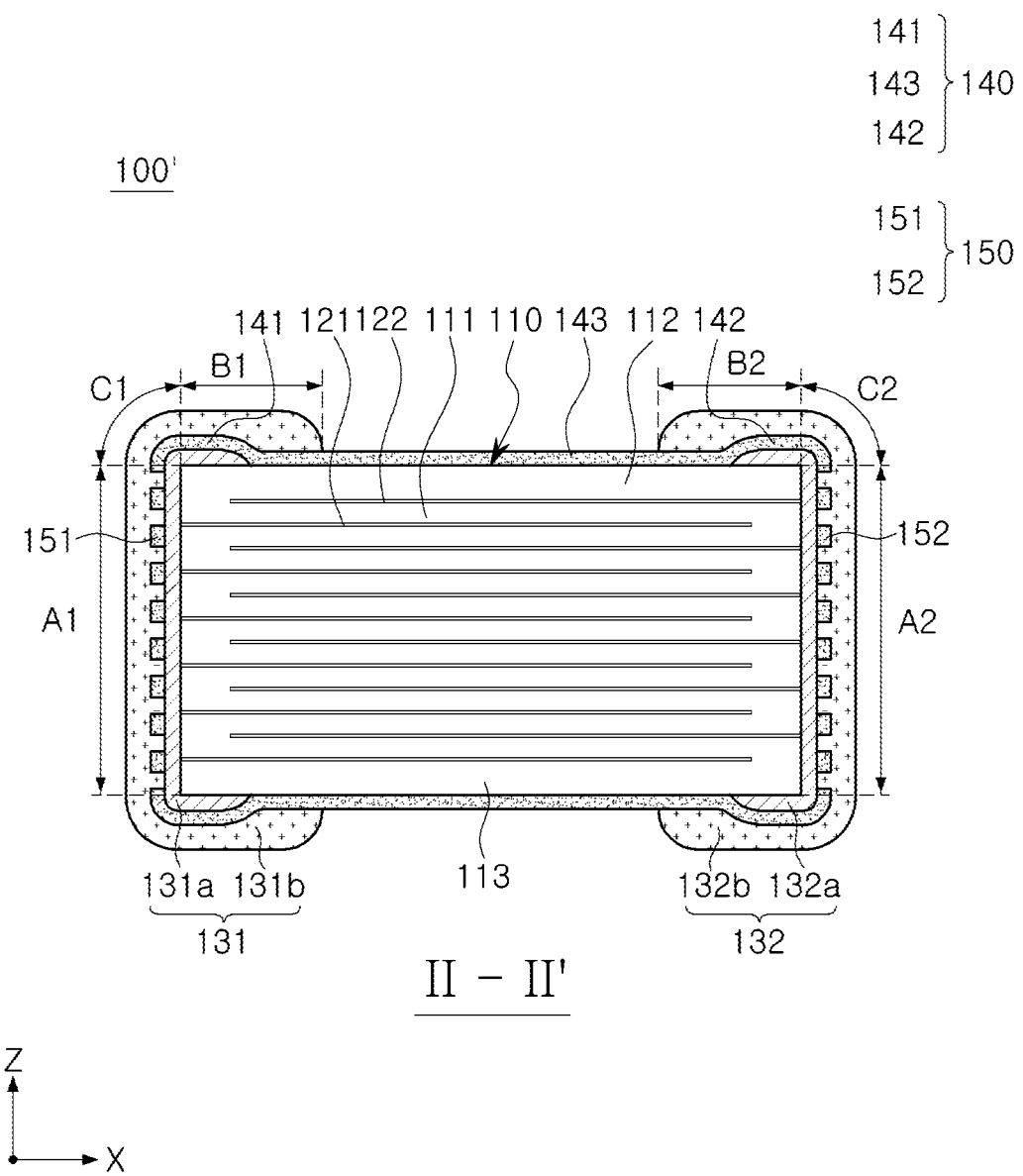
FIG. 6 is a cross-sectional view taken along line II-II' in FIG. 5.

FIG. 6 is a cross-sectional view taken along line II-II' in FIG. 5.

Hereinafter, a multilayer electronic component 100' according to the other embodiment will be described with reference to FIGS. 5 and 6. However, descriptions common to the laminated electronic component 100 according to an embodiment will be omitted to avoid duplicate descriptions.

The multilayer electronic component 100' according to another embodiment has a plurality of island-shaped adhesive portions 151 and 152 disposed on a first connecting portion A1 of a first electrode layer 131a and on a second connecting portion A2 of a second electrode layer 132a.

Referring to FIG. 6, the plurality of island-shaped adhesive portions 151 and 152 may be disposed between the first electrode layer 131a and the first conductive resin layer 131b of the first connection portion A1 and between the second electrode layer 132a and the second conductive resin layer 132b of the second connection portion A2.

The plurality of island-shaped adhesive portions 151 and 152 serves to improve adhesion between the electrode layer and the conductive resin layer. As the adhesion between the electrode layer and the conductive resin layer is improved, a defect such as electrode lifting, or the like, may be prevented.

Each of the plurality of island-shaped adhesive portions 151 and 152 may include a base resin, and may correspond to an isolated segment of adhesive portion spaced apart from other isolated segments of adhesive portion on the connection portions A1 and A2.

The base resin, included in each of the plurality of island-shaped adhesive portions 151 and 152, is not limited as long as adhesion and impact absorption are provided thereby, and may be, for example, an epoxy-based resin.

Each of the plurality of island-shaped adhesive portions 151 and 152 may include a base resin, and may include one or more of silica, alumina, glass, or zirconium dioxide ($ZrO_2$). Silica, alumina, glass, and zirconium dioxide ($Zr_2$) may serve to improve an applying shape of each of the plurality of island-shaped adhesive portions 151 and 152 and to improve thermal resistance.

The plurality of island-shaped adhesive portions 151 and 152 may be formed by forming the first and second electrode layers 131a and 132a on the body 110 including dielectric layers and internal electrodes, forming a non-conductive resin layer 140 on an exposed external surface of the body 110 and the first and second electrode layers 131a and 132a, and removing only a portion of the non-conductive resin layer 140 formed on the connection portions A1 and A2 of the first and second electrode layers 131a and 132a.

Therefore, the plurality of island-shaped adhesive portions 151 and 152 may be formed of the same material as the non-conductive resin layer 140.

An area of the plurality of island-shaped adhesive portions 151 may be 20 to 40% of an area of the first connection portion A1 of the first electrode layer 131a, or an area of the plurality of island-shaped adhesive portions 152 may be 20 to 40% of an area of the second connection portion A2 of the second electrode layer 132a.

Table 1 shows ESR and adhesion evaluation results depending on a ratio of an area S2 of adhesive portions to an area S1 of a connection portion of an electrode layer (S2/S1).

The adhesion was evaluated by measuring energy needed to remove a conductive resin layer from the electrode layer using a bond tester. As compared with a case in which the area S2 of the adhesive portion is 0, a case in which an adhesive force improvement effect was less than 5% was indicated by ∆, a case in which the effect was 5% or more to 20% or less was indicated by ○, and a case in which the effect was 20% or more was indicated by ◎.

ESR evaluation was performed by measuring ESR of 100 samples at a magnetic resonance frequency using an LCR meter. A case in which a coefficient of variation (CV) was more than or equal to 10% was indicated by ∆, a case in which the CV was 3% or more to less than 10% was indicated by ○, and a case in which the CV was less than 3% was indicated by ◎.

TABLE 1

| No. | S2/S1 | ESR | Adhesion |
| --- | --- | --- | --- |
| 1 | 0.1 | ◎ | ∆ |
| 2 | 0.2 | ○ | ○ |
| 3 | 0.3 | ○ | ○ |
| 4 | 0.4 | ○ | ○ |
| 5 | 0.5 | ∆ | ◎ |

In the case of Test No. 1 in which the ratio of an area S2 of an adhesive portion to an area S1 of a connection portion of an electrode layer (S2/S1) is 0.1, ESR characteristics are excellent but the adhesion is poor.

In the case of Test No. 5 in which the ratio of an area S2 of an adhesive portion to an area S1 of a connection portion of an electrode layer (S2/S1) is 0.5, the adhesion is excellent but ESR characteristics are poor.

Therefore, the area of each of the plurality of island-shaped adhesive portions 151 and 152 may be set to 20 to 40% of the area of the first connection portion A1 of the first electrode layer 131a or the area of the second connection portion A2 of the second electrode layer 132a, securing both excellent adhesion and excellent ESR characteristics.

As described above, a multilayer electronic component may include a non-conductive resin layer including a body cover portion disposed in a region of an external surface of a body in which an electrode layer is not disposed, and an extending portion extending from the body cover portion between an electrode layer and a conductive resin layer of external electrodes, and thus, may suppress arc discharge.

In addition, the non-conductive resin layer may be provided to improve bending strength characteristics.

While embodiments have been shown and described above, it will be apparent to those skilled in the art that modifications and variations could be made without departing from the scope of the present disclosure as defined by the appended claims.

What is claimed is:

1. A multilayer electronic component comprising:
a body including dielectric layers, and first internal electrodes and second internal electrodes alternately disposed with respective dielectric layers interposed therebetween in a first direction, and having first and second surfaces opposing each other in the first direction, third and fourth surfaces connected to the first and second surfaces and opposing each other in a second direction, and fifth and sixth surfaces connected to the first to fourth surfaces and opposing each other in a third direction;
a first external electrode including a first electrode layer connected to the first internal electrodes and a first conductive resin layer disposed on the first electrode layer, and having a first connection portion disposed on the third surface of the body and a first band portion extending from the first connection portion to a portion of each of the first, second, fifth, and sixth surfaces;
a second external electrode including a second electrode layer connected to the second internal electrodes and a second conductive resin layer disposed on the second electrode layer, and having a second connection portion disposed on the fourth surface of the body and a second band portion extending from the second connection portion to a portion of each of the first, second, fifth, and sixth surfaces; and
a non-conductive resin layer having a body cover portion disposed in a region of external surfaces of the body in which the first and second electrode layers are not disposed, a first extending portion disposed to extend from the body cover portion between the first electrode layer and the first conductive resin layer of the first band portion, and a second extending portion disposed to extend from the body cover portion between the second electrode layer and the second conductive resin layer of the second band portion,
wherein the first extending portion extends on a portion of the third surface of the body to cover a portion of the body in the second direction,
the second extending portion extends on a portion of the fourth surface of the body to cover a portion of the body in the second direction, and
the first and second extending portions does not cover the first and second internal electrodes in the second direction.

2. The multilayer electronic component of claim 1, wherein the first and second conductive resin layers include a conductive metal and a base resin.

3. The multilayer electronic component of claim 1, wherein the first and second conductive resin layers include a plurality of metal particles, an intermetallic compound, and a base resin.

4. The multilayer electronic component of claim 3, wherein the plurality of metal particles include at least one of silver (Ag), nickel (Ni), or copper (Cu), and the intermetallic compound includes at least one of $Ag_3Sn$, $Ni_3Sn4$, $Cu_6Sn_5$, or $Cu_3Sn$.

5. The multilayer electronic component of claim 1, wherein the non-conductive resin layer includes a base resin, and includes one or more of silica, alumina, glass, or zirconium dioxide ($ZrO_2$).

6. The multilayer electronic component of claim 1, wherein a distance from the third surface of the body to an end of the first conductive resin layer is greater than a distance from the third surface of the body to an end of the first electrode layer, and a distance from the fourth surface of the body to an end of the second conductive resin layer is greater than a distance from the fourth surface of the body to an end of the second electrode layer.

7. The multilayer electronic component of claim 1, wherein the first extending portion is disposed to extend to a portion of the first connection portion between the first electrode layer and the first conductive resin layer, and
the second extending portion is disposed to extend to a portion of the second connection portion between the second electrode layer and the second conductive resin layer.

8. The multilayer electronic component of claim 1, wherein a length of the first conductive resin layer of the first band portion and a length of the second conductive resin layer of the second band portion are each between 10% and 20% of a length of the body.

9. The multilayer electronic component of claim 1, wherein a plurality of adhesive portion segments are further disposed spaced apart from each other on the first connection portion of the first electrode layer and spaced apart from each other on the second connection portion of the second electrode layer.

10. The multilayer electronic component of claim 9, wherein each of the adhesive portion segments includes a base resin.

11. The multilayer electronic component of claim 9, wherein each of the adhesive portion segments includes a base resin, and includes one or more of silica, alumina, glass, or zirconium dioxide ($ZrO_2$).

12. The multilayer electronic component of claim 9, wherein each of the adhesive portion segments is formed of the same material as the non-conductive resin layer.

13. The multilayer electronic component of claim 9, wherein an area of the adhesive portion segments on the first connection portion is 20 to 40% of an area of the first connection portion of the first electrode layer, or an area of the adhesive portion segments on the second connection portion is 20 to 40% of an area of the second connection portion of the second electrode layer.

14. The multilayer electronic component of claim 1, further comprising:
first and second plating layers respectively disposed on the first and second conductive resin layers.

15. The multilayer electronic component of claim 1, wherein a distance from the third surface of the body to an end of the first conductive resin layer is greater than a distance from the third surface of the body to an end of the first electrode layer, and
the end of the first conductive resin layer is in contact with the body cover portion of the non-conductive resin layer.

16. The multilayer electronic component of claim 1, wherein a distance from the fourth surface of the body to an end of the second conductive resin layer is greater than a distance from the fourth surface of the body to an end of the second electrode layer, and the end of the second conductive resin layer is in contact with the body cover portion of the non-conductive resin layer.

\* \* \* \* \*